(12) United States Patent
Wike

(10) Patent No.: US 11,499,862 B2
(45) Date of Patent: Nov. 15, 2022

(54) LOAD SENSING SYSTEM FOR A RAILWAY TRUCK ASSEMBLY

(71) Applicant: Amsted Rail Company, Inc., Chicago, IL (US)

(72) Inventor: Paul Steven Wike, St. Louis, MO (US)

(73) Assignee: Amsted Rail Company, Inc., Chicago, IL (US)

( * ) Notice: Subject to any disclaimer, the term of this patent is extended or adjusted under 35 U.S.C. 154(b) by 625 days.

(21) Appl. No.: 16/660,149

(22) Filed: Oct. 22, 2019

(65) Prior Publication Data

US 2020/0132537 A1    Apr. 30, 2020

Related U.S. Application Data

(60) Provisional application No. 62/750,614, filed on Oct. 25, 2018.

(51) Int. Cl.
| | | |
|---|---|---|
| *G01G 19/04* | (2006.01) | |
| *B61F 5/52* | (2006.01) | |
| *B61K 9/02* | (2006.01) | |
| *G01L 5/00* | (2006.01) | |
| *G01M 17/10* | (2006.01) | |

(52) U.S. Cl.
CPC ............ *G01G 19/042* (2013.01); *B61F 5/52* (2013.01); *B61K 9/02* (2013.01); *G01G 19/047* (2013.01); *G01L 5/0038* (2013.01); *G01M 17/10* (2013.01)

(58) Field of Classification Search
CPC .......... B61F 5/52; B61K 9/02; G01G 19/042; G01G 19/047; G01L 5/0038
See application file for complete search history.

(56) References Cited

U.S. PATENT DOCUMENTS

| | | | |
|---|---|---|---|
| 2,601,781 A | 7/1952 | Fillion | |
| 4,042,810 A | 8/1977 | Mosher | |
| 4,838,173 A | 6/1989 | Schroeder et al. | |
| 5,325,700 A | 7/1994 | Litten | |
| 5,811,738 A * | 9/1998 | Boyovich | G01G 19/12 |
| | | | 177/136 |
| 5,883,337 A | 3/1999 | Dolan | |

(Continued)

FOREIGN PATENT DOCUMENTS

| | | |
|---|---|---|
| DE | 10 2010 056434 | 2/2012 |
| EP | 0884570 | 12/1998 |

(Continued)

OTHER PUBLICATIONS

U.S. Appl. No. 16/331,192, filed Mar. 7, 2019.

(Continued)

*Primary Examiner* — Natalie Huls
(74) *Attorney, Agent, or Firm* — The Small Patent Law Group LLC; Joseph M. Butscher

(57) ABSTRACT

A truck assembly for a rail vehicle includes at least one side frame including at least one lightener hole. At least one strain gage is disposed within the lightener hole(s). The strain gage(s) is configured to detect forces exerted into or onto the truck assembly. A method of detecting forces exerted into or onto a truck assembly of a rail vehicle includes disposing at least one strain gage within at least one lightener hole of at least one side frame of a truck assembly of the rail vehicle, and detecting the forces by the strain gage(s).

23 Claims, 6 Drawing Sheets

(56) References Cited

U.S. PATENT DOCUMENTS

| | | | |
|---|---|---|---|
| 6,441,324 B1* | 8/2002 | Stimpson | G01G 19/12 |
| | | | 177/DIG. 9 |
| 6,470,759 B1* | 10/2002 | Scott | G01L 1/2243 |
| | | | 73/862.639 |
| 7,926,427 B1 | 4/2011 | Ricks | |
| 2003/0111277 A1* | 6/2003 | Aumard | G01G 3/1412 |
| | | | 177/229 |
| 2007/0152107 A1* | 7/2007 | LeFebvre | B61K 9/00 |
| | | | 246/169 R |
| 2008/0128562 A1 | 6/2008 | Kumar | |
| 2010/0174427 A1 | 7/2010 | Sivasubramaniam | |
| 2012/0138752 A1 | 6/2012 | Carlson | |
| 2014/0162528 A1 | 6/2014 | Derby | |
| 2014/0261064 A1 | 9/2014 | Wike | |
| 2015/0219487 A1* | 8/2015 | Maraini | G01G 19/042 |
| | | | 177/136 |
| 2016/0137212 A1 | 5/2016 | James | |
| 2016/0320229 A1 | 11/2016 | Nihimura | |
| 2017/0241828 A1* | 8/2017 | Reichow | G01G 19/021 |
| 2018/0094961 A1* | 4/2018 | Krueger | G01F 25/20 |
| 2018/0364117 A1 | 12/2018 | Seidel | |
| 2020/0141823 A1* | 5/2020 | Wang | G01G 3/1412 |
| 2021/0291882 A1* | 9/2021 | Snyder | B61L 25/021 |
| 2021/0362755 A1* | 11/2021 | Wike | B61F 5/52 |

FOREIGN PATENT DOCUMENTS

| | | |
|---|---|---|
| EP | 2679967 | 1/2014 |
| EP | 2902752 | 8/2015 |
| JP | 2002 079941 | 3/2002 |
| JP | 2004 209995 | 7/2004 |

OTHER PUBLICATIONS

Notification of Transmittal of the International Search Report and the Written Opinion for PCT/US2019/057394, dated Feb. 4, 2020.

* cited by examiner

LOAD SENSING SYSTEM FOR A RAILWAY TRUCK ASSEMBLY

RELATED APPLICATIONS

This application relates to and claims priority benefits from U.S. Provisional Patent Application No. 62/750,614, filed Oct. 25, 2018, which is hereby incorporated by reference in its entirety.

FIELD OF THE DISCLOSURE

Embodiments of the present disclosure generally relate to truck assemblies for rail vehicles, such as rail cars, and, more particularly, to load sensing systems for truck assemblies that are configured to measure operational performance of the truck assemblies and/or the rail vehicles.

BACKGROUND OF THE DISCLOSURE

Rail vehicles travel along railways, which have tracks that include rails. A rail vehicle includes one or more truck assemblies that support one or more car bodies.

A truck assembly forms a bottom portion of a rail vehicle. The car body generally rides on top of two truck assemblies to form the rail vehicle or rail car. Motions created by a rail vehicle as it moves on and over a track produce measurable forces (for example, loads) that travel through the truck assemblies and into the car body. Over time, the forces that act on the rail vehicle may change.

SUMMARY OF THE DISCLOSURE

A need exists for a sensor system and method for a truck assembly of a rail vehicle that effectively determine various forces exerted into and/or onto the truck assembly and/or the rail vehicle.

With those needs in mind, certain embodiments of the present disclosure provide a truck assembly for a rail vehicle. The truck assembly includes at least one side frame including at least one lightener hole, and at least one strain gage disposed within the lightener hole(s). The strain gage(s) is configured to detect forces exerted into or onto the truck assembly.

In at least one embodiment, the truck assembly includes a first side frame and a second side frame. The first side frame may include a first lightener hole, and the second side frame may include a second lightener hole. A first strain gage may be disposed in the first lightener hole, and a second strain gage may be disposed in the second lightener hole.

First and second strain gages may be disposed in the first lightener hole, for example. In such an embodiment, the first strain gage and the second strain gage may be symmetrically disposed in relation to a longitudinal plane of the first side frame, for example.

In at least one embodiment, a first inboard lightener hole is formed in a first end of the first side frame. A second inboard lightener hole is formed in a second end of the first side frame. A third inboard lightener hole is formed in a first end of the second side frame, and a fourth inboard lightener hole is formed in a second send of the second side frame. In at least one embodiment, a first strain gage is disposed within the first inboard lightener hole. A second strain gage is disposed within the first inboard lightener hole. A third strain gage is disposed within the second inboard lightener hole. A fourth strain gage is disposed within the second inboard lightener hole. A fifth strain gage is disposed within the third inboard lightener hole. A sixth strain gage is disposed within the third inboard lightener hole. A seventh strain gage is disposed within the fourth inboard lightener hole. An eighth strain gage is disposed within the fourth inboard lightener hole.

In at least one embodiment, at least one force analysis control unit is in communication with the strain gage(s). The force analysis control unit(s) is configured to analyze at least one force signal received from the strain gage(s). The force analysis control unit(s) may be disposed on or within the truck assembly. In at least one embodiment, at least one electronics housing is secured within the lightener hole(s). The force analysis control unit(s) may be contained within the electronics housing(s). The electronics housing(s) may cover and protect the at least one strain gage(s).

In at least one embodiment, the strain gage(s) is secured to at least one rim that defines the lightener hole(s). The rim(s) may include at least one recessed pocket. The strain gage(s) may be secured to the recessed pocket(s).

Certain embodiments of the present disclosure provide a method of detecting forces exerted into or onto a truck assembly of a rail vehicle. The method includes disposing at least one strain gage within at least one lightener hole of at least one side frame of a truck assembly of the rail vehicle, and detecting the forces by the strain gage(s).

In at least one embodiment, the disposing includes disposing a first strain gage within a first inboard lightener hole of a first side frame, disposing a second strain gage within the first inboard lightener hole of the first side frame, disposing a third strain gage a second inboard lightener hole of the first side frame, disposing a fourth strain gage within the second inboard lightener hole of the first side frame, disposing a fifth strain gage within a third inboard lightener hole of a second side frame, disposing a sixth strain gage within the third inboard lightener hole of the second side frame, disposing a seventh strain gage within a fourth inboard lightener hole of the second side frame, and disposing an eighth strain gage within the fourth inboard lightener hole of the second side frame.

The method may also include communicatively coupling at least one force analysis control unit with the strain gage(s), and analyzing, by the force analysis control unit(s), at least one force signal received from the strain gage(s). The method may also include disposing the force analysis control unit(s) within the lightener hole(s). The method may also include covering and protecting the strain gage(s) with at least one electronics housing that contains the force analysis control unit(s).

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a sensor system for a truck assembly of a rail vehicle. The sensor system is configured to obtain measurements from strain gages attached in lightener holes formed in side frames of the truck assembly. In at least one embodiment, the strain gages are configured to measure displacement of the side frame structure that is created by loads and other such forces. As an example, two opposing strain gauges are located in a lightener hole. The combination of loads and other such forces measured at various locations are used to identify events experienced by a rail vehicle. For example, combinations of loads or forces are associated with one or more recognized events, including, for example, vehicle dynamics, impacts, braking, and vehicle load status (loaded or empty weight).

In at least one embodiment, a sensor system analyzes performance of the rail vehicle in operation. Motions created by the rail vehicle, as it moves on the track, produce loads and other such forces that can be measured. The loads and forces create structural strain displacement at the lightener holes of the truck side frame. Comparing the strain measurements of both truck assemblies of a rail vehicle determines the type of event that occurred. Analyzing the time history of vehicle dynamics, impacts, and braking events can provide information regarding status of components of the truck assemblies and/or rail vehicle.

Certain embodiments of the present disclosure provide a truck assembly for a rail vehicle. The truck assembly includes at least one side frame including at least one lightener hole, and at least one strain gage disposed within the lightener hole(s). The strain gage(s) is configured to detect forces exerted into or onto the truck assembly.

Certain embodiments of the present disclosure provide a method of detecting forces exerted into or onto a truck assembly of a rail vehicle. The method includes disposing at least one strain gage within at least one lightener hole of at least one side frame of a truck assembly of the rail vehicle, and detecting the forces by the strain gage(s).

Figure 1:
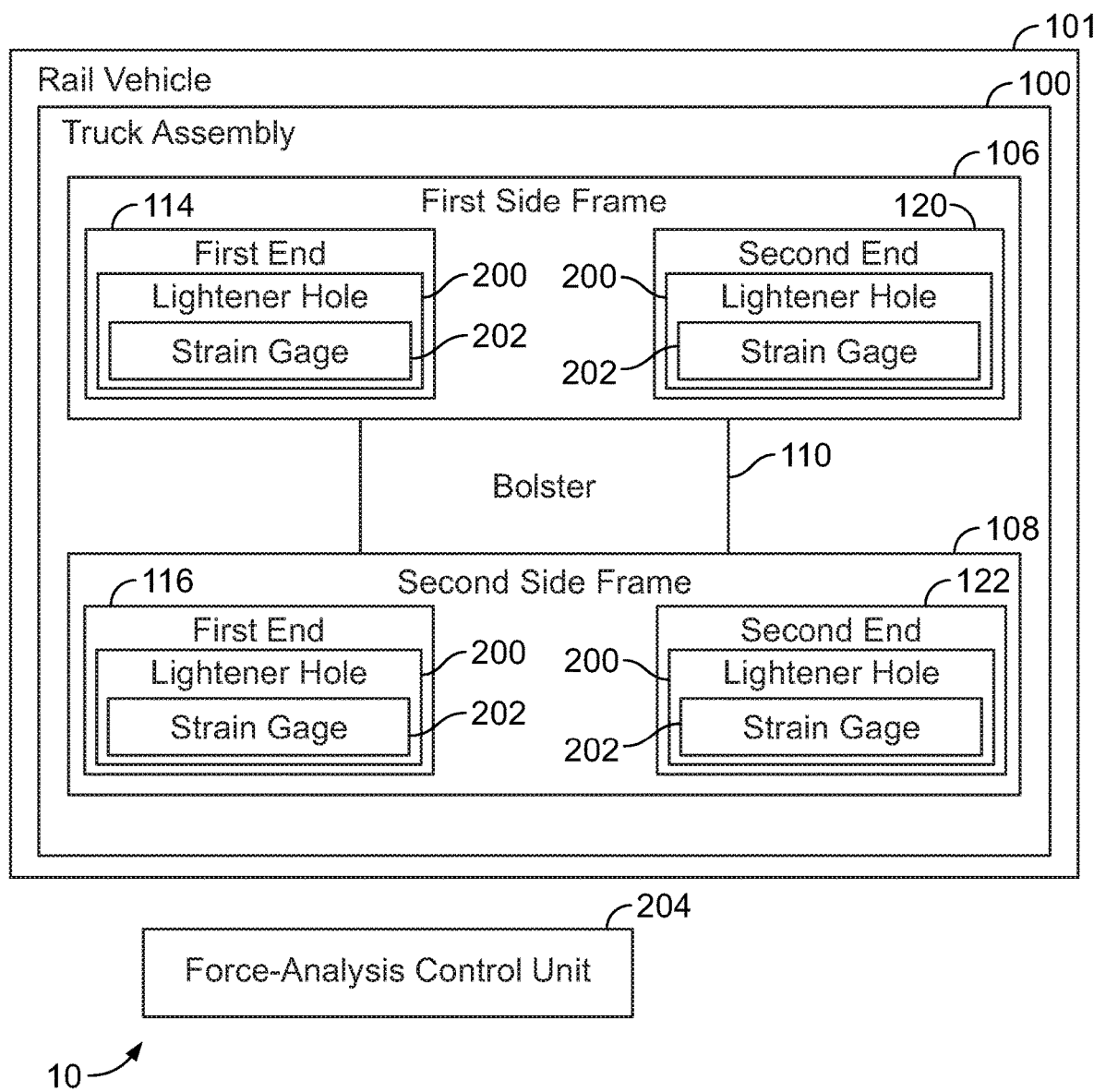
FIG. 1 illustrates a schematic block diagram of a sensor system for a truck assembly of a rail vehicle, according to an embodiment of the present disclosure.

FIG. 1 illustrates a schematic block diagram of a sensor system 10 for a truck assembly 100 of a rail vehicle 101, according to an embodiment of the present disclosure. The truck assembly 100 includes a first side frame 106 coupled to a second side frame 108 by a bolster 110. The first side frame 106 includes a first end 114 and a second end 120. The second side frame 108 includes a first end 116 and a second end 122.

FIG. 1 shows one truck assembly 100. In at least one embodiment, the rail vehicle 101 includes a first truck assembly 100 and a second truck assembly 100. A car body is supported by the truck assemblies 100. Each of the first and second truck assemblies 100 is configured as shown and described herein.

Lightener holes 200 are formed in the first ends 114, 116, and the second ends 120, 122. The lightener holes 200 are voids or spaces formed in the truck assembly 100. The lightener holes 200 are formed to reduce mass and weight of the truck assembly 100.

One or more strain gages 202 are disposed within the lightener holes 200. For example, two strain gages 202 are disposed in a lightener hole 200, thereby providing a total of eight strain gages 202 within the truck assembly 100. The strain gages 202 are configured to detect forces exerted into the truck assembly 100.

A force analysis control unit 204 is in communication with each of the strain gages 202, such as through one or more wired or wireless connections. The sensor system 10 includes the force analysis control unit(s) 204 in communication with the strain gages 202.

In at least one embodiment, the force analysis control unit 204 is disposed on and/or within the truck assembly 100. In at least one other embodiment, the force analysis control unit 204 is remotely located from the truck assembly 100, such as at another location on or within the rail vehicle 101, or at a central monitoring location that is remote from the rail vehicle 101.

In at least one embodiment, a force analysis control unit 204 is disposed within each lightener hole 200, thereby providing a total of four force analysis control units 204 within the truck assembly 100. The force analysis control units 204 may be in communication with one another, such as through one or more wired or wireless connections. In at least one embodiment, one of the four force analysis control units 204 may be a master force analysis control unit 204 that receives data from all of the force analysis control units 204. In at least one other embodiment, a separate and distinct master force analysis control unit 204 may be in communication with the four force analysis control units 204 within the lightener holes 200.

In at least one embodiment, the strain gages 202 detect bending and shear about sections of the side frames 106 and 108, such as directly below the lightener holes 200. Forces in relation to neutral Y-Y and Z-Z axes of the section may be measured at the side walls of the lightener holes.

In operation, the strain gages 202 within the lightener holes 200 detect forces (such as loads and/or other such forces) exerted into the truck assembly 100 and output force signals to the force analysis control unit(s) 204. The force analysis control unit 204 analyzes the force signals to determine events experienced by the truck assembly 100. For example, the force analysis control unit 204 may have a memory that stores data regarding various track events, such as braking, hunting, inconsistencies between wheels coupled to the first side frame 106 and the second side frame 108, and/or the like. In at least one embodiment, various track events are predetermined and collected and stored as track event data. The track event data is stored in the memory of and/or coupled to the force analysis control unit 204. The force analysis control unit 204 compares the data received from the strain gages 202 via the force signals, and recognizes various track events experienced by the truck assembly 100 through analysis of the track event data. The force analysis control unit 204 may then output event signals including determined track event data to a user interface and/or a memory or database. The determined track event data is indicative of the event(s) experiences by the truck assembly 100, as detected by the strain gages 202 and analyzed by the force analysis control unit 204.

The sensor system 10, including the force analysis control unit(s) 204 in communication with the strain gages 202, is configured to measure or otherwise determine the operational performance of the rail vehicle 101. A load or other such force exerted onto or into the truck assembly 100 creates an event that is measurable by the sensor system 10. In at least one embodiment, the force analysis control unit(s) 204 analyze (for example, compare) signals including data from all of the strain gages 202 to identify a type of event, such as vehicle dynamics, impacts, braking and loaded or empty weight, as determined by the force analysis control unit 204.

The forces (including loads) travel through components (such as the side frames 106 and 108) of the truck assembly 100 and into a car body of the rail vehicle 101. The force analysis control unit(s) 204 compares or otherwise analyzes forces in relation to the lightener holes 200 to determine a type of event experienced by the rail vehicle. The analysis of forces over time can be used to determine if and when the components are due for maintenance, repair, or replacement.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the force analysis control unit 204 (and/or portions thereof) may be or include one or more processors that are configured to control operation thereof, as described herein.

The force analysis control unit 204 is configured to execute a set of instructions that are stored in one or more data storage units or elements (such as one or more memories), in order to process data. For example, the force analysis control unit 204 may include or be coupled to one or more memories. The data storage units may also store data or other information as desired or needed. The data storage units may be in the form of an information source or a physical memory element within a processing machine.

The set of instructions may include various commands that instruct the force analysis control unit 204 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the force analysis control unit 204. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the force analysis control unit 204 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
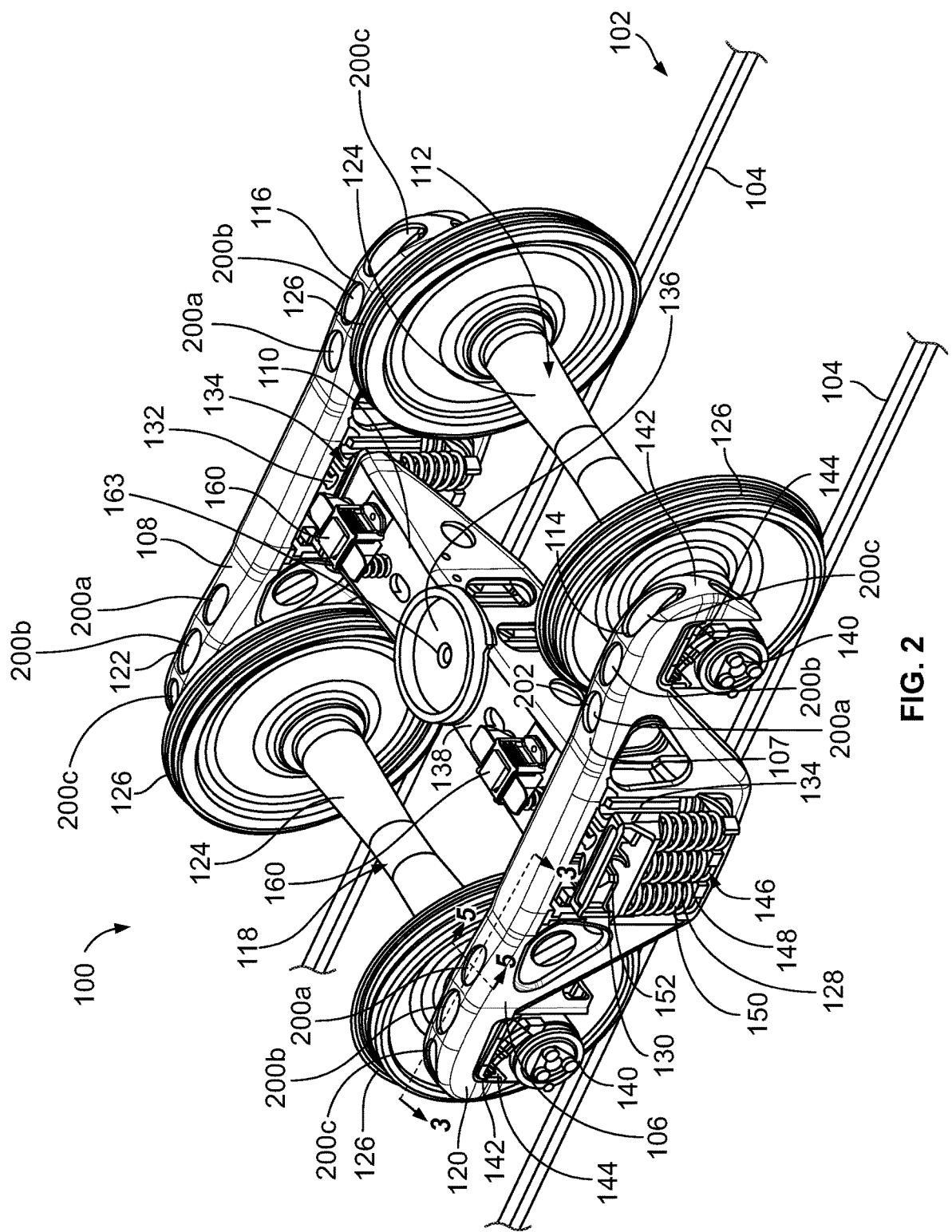
FIG. 2 illustrate a perspective top view of a truck assembly, according to an embodiment of the present disclosure.

FIG. 2 illustrate a perspective top view of the truck assembly 100, according to an embodiment of the present disclosure. The truck assembly 100 is configured to travel along a track 102 having rails 104. The truck assembly 100 includes the first side frame 106 and the second side frame 108, which are spaced apart from one another. The bolster 110 extends between the first side frame 106 and the second side frame 108, and couples the first side frame 106 to the second side frame 108.

A first wheel set 112 is rotatably coupled to first ends 114 and 116 of the first side frame 106 and the second side frame 108, respectively, and a second wheel set 118 is rotatably coupled to second ends 120 and 122 of the first side frame 106 and the second side frame 108, respectively. Each of the first and second wheel sets 112 and 118 includes an axle 124 connected to wheels 126. The wheels 126 are supported on the rails 104 and are configured to travel thereon as the axles 124 rotate in relation to the first side frame 106 and the second side frame 108.

The first and second side frames 106 and 108 includes damper systems 128. For example, the damper systems 128 include one or more springs, friction shoes, and the like that are configured to dampen forces exerted into and/or by the truck assembly 100 as the truck assembly 100 travels along the track 102.

The bolster 110 includes ends 130 and 132 (for example a first end 130 and an opposite second end 132), which extend through openings 134 of the side frames 106 and 108. The bolster 110 also includes a bolster center bowl 136 outwardly extending from an upper surface 138. As shown, the bolster center bowl 136 is centrally located on the upper surface 138 of the bolster 110 between the ends 130 and 132.

Ends of the axles 124 are rotatably retained by bearings 140, which are coupled to the side frames 106 and 108. In particular, the wheel sets 112 and 118 are coupled to the side frames 106 and 108 at pedestals 142 of the side frames 106 and 108. The pedestals 142 connect to bearing adapters 144 that connect to the bearings 140.

In at least one embodiment, the damping systems 128 include spring groups 146 supported within the openings 134 of the side frames 106 and 108. The spring groups 146 include load coils 148 and control coils 150. The load coils 148 support the bolster 110 at the ends 130 and 132. The control coils 150 support friction shoes 152.

Friction assist side bearing assemblies 160 are mounted on the top surface 138 of the bolster 110 between the bolster center bowl 136 and the end 130. Each friction assist side bearing assembly 160 may be spaced from a center 163 of the bowl 136 the same distance, but in opposite directions.

Lightener holes 200 are formed in the first ends 114, 116 of the first side frame 106 and the second side frame 108, respectively, and in the second ends 120, 122 of the first side frame 106 and the second side frame 108, respectively. As shown in relation to the first end 114 of the first side frame 106, three lightener holes 200a, 200b, and 200c may be formed through a top surface 107 of the first side frame 106 (and similarly with respect to the other end of the first side frame 106 and both ends of the second side frame 108) The lightener hole 200a is inboard in relation to (for example, closer to the bolster 110) the lightener hole 200b. The lightener hole 200c is outboard in relation to (for example, further away from the bolster 110) to the lightener hole 200b. The lightener hole 200a is an inboard lightener hole 200a. The lightener hole 200b is an intermediate lightener hole 200b. The lightener hole 200c is an outboard lightener hole 200c. Each of the first end 114 and the second end 120 of the first side frame 106 may include an inboard lightener hole 200a, an intermediate lightener hole 200b, and an outboard lightener hole 200c. Further, each of the first end 116 and the second end 122 of the second side frame 108 may include an inboard lightener hole 200a, an intermediate lightener hole 200b, and an outboard lightener hole 200c.

One or more strain gages 202 are disposed within one or more of the lightener holes 200. For example, one or more strain gages 202 are disposed within each of the inboard lightener holes 200a. It has been determined through observation and analysis that the inboard lightener holes 200a are areas of increased stress on the side frames 106 and 108. For example, the inboard lightener holes 200a are the areas of highest stress in relation to the side frames 106 and 108. Accordingly, disposing the strain gages 202 within the inboard lightener holes 200a allows for effective and accurate detection of forces (such as stresses and strains) exerted into the side frames 106 and 108. Optionally, one or more strain gages 202 may be disposed within one or both of the intermediate lightener holes 200b or the outboard lightener holes 200c in addition to or in lieu of the inboard lightener holes 200a. Further, the side frames 106 and 108 may include more or less lightener holes 200 than shown. For example, the side frames 106 and 108 may include only the inboard lightener holes 200a. As another example, the first ends 114, 116, and the second ends 120 and 122 may include four or more lightener holes 200. Strain gages 202 may be disposed within any and/or all of the lightener holes 200.

Figure 3:
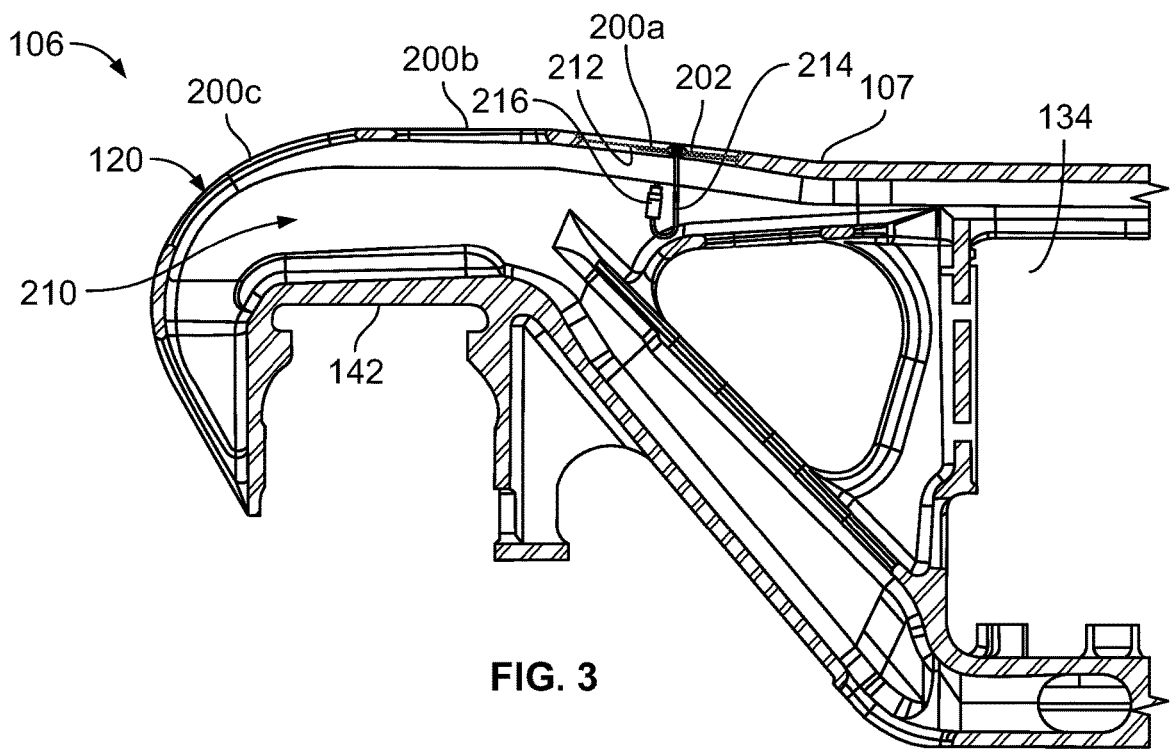
FIG. 3 illustrates a cross-sectional view of an end of a side frame through line 3-3 of FIG. 2, according to an embodiment of the present disclosure.
Figure 4:
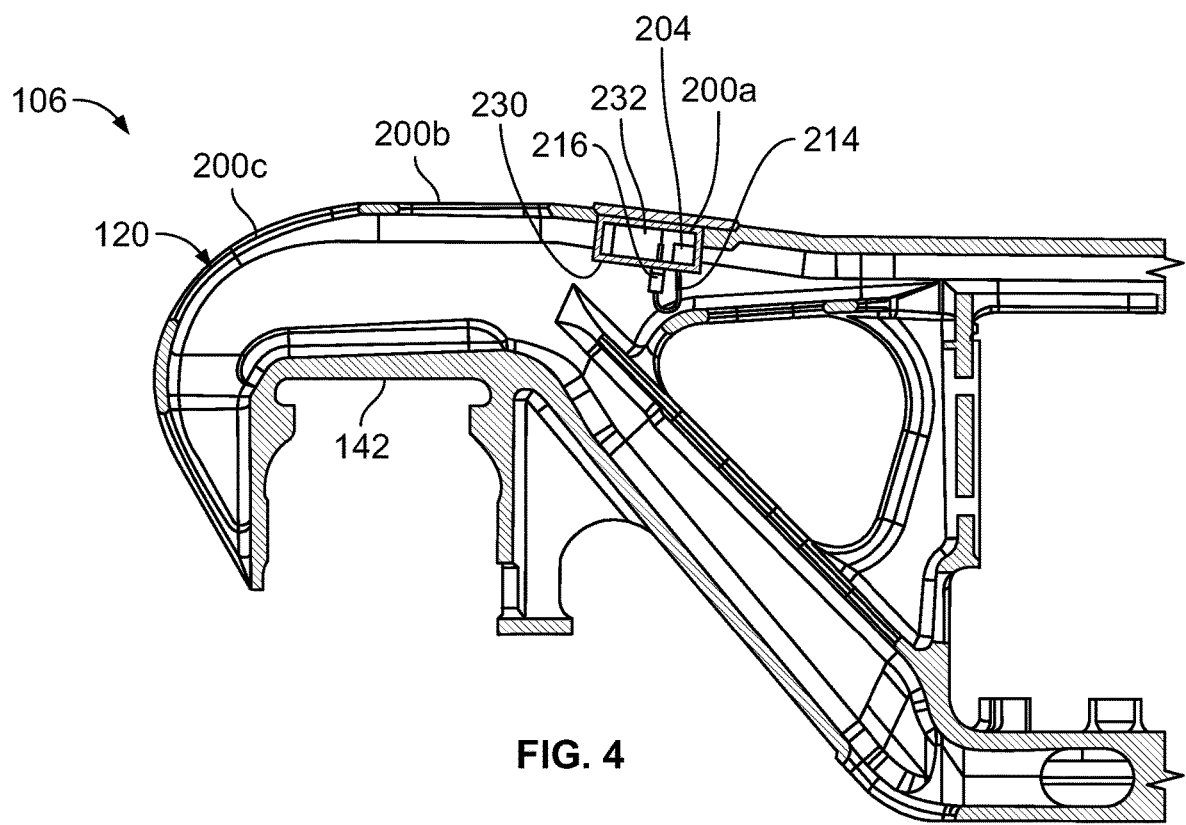
FIG. 4 illustrates a cross-sectional view of an end of a side frame through line 3-3 of FIG. 2, according to an embodiment of the present disclosure.
Figure 5:
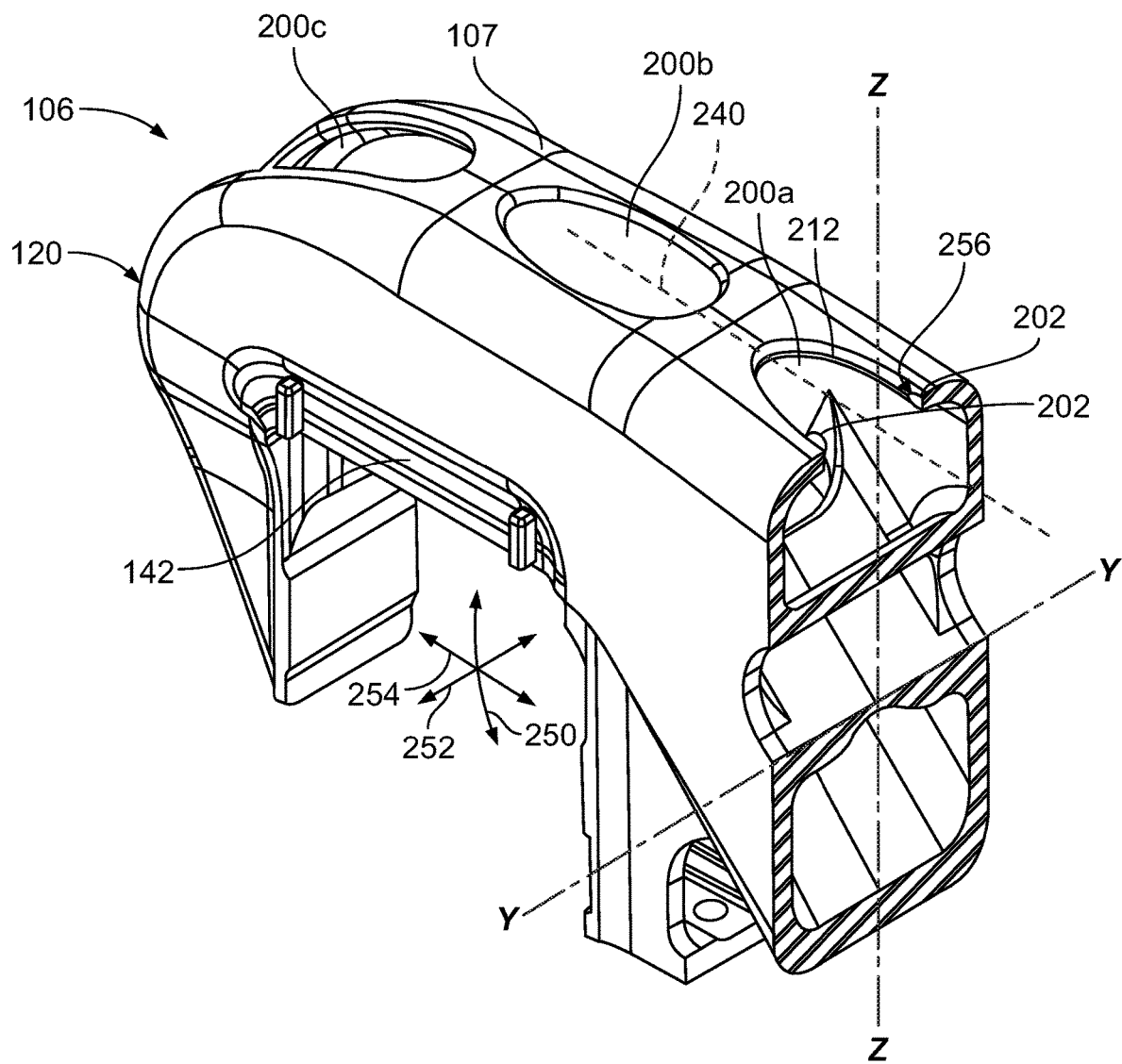
FIG. 5 illustrates a perspective cross-sectional view of a side frame through line 5-5 of FIG. 2, according to an embodiment of the present disclosure.

FIG. 3 illustrates a cross-sectional view of an end of a side frame through line 3-3 of FIG. 2, according to an embodiment of the present disclosure. As an example, the end is the second end 120 of the first side frame 106. It is to be understood that FIGS. 3-5 are also applicable to the first end 114 (shown in FIGS. 1 and 2) of the first side frame 106, the first end 116 of the second side frame 108 (shown in FIGS. 1 and 2), and the second end 122 of the second side frame 108 (shown in FIGS. 1 and 2).

Each of the inboard lightener hole 200a, the intermediate lightener hole 200b, and the outboard lightener hole 200c are holes formed through the top surface 107 of the first side frame 106. The inboard lightener hole 200a, the intermediate lightener hole 200b, and the outboard lightener hole 200c lead into an internal cavity or chamber 210 of the first side frame 106.

The inboard lightener hole 200a is inboard from the pedestal 142, and outboard from the opening 134. As noted, it has been determined that the inboard lightener hole 200a is an area of increased stress and strain of the first side frame 106. Accordingly, disposing the strain gage 202 within the inboard lightener hole 200a provides effective and accurate detection of forces exerted into and/or onto the first side frame 106.

In at least one embodiment, the strain gage 202 is secured to an interior rim 212 that defines the inboard lightener hole 200a. For example, the strain gage 202 may be adhesively secured to the interior rim 212. As another example, the strain gage 202 may be welded or bonded to the interior rim 212.

The strain gage 202 may be coupled to an electrical cord 214 having a plug 216. The plug 216 is configured to couple to a receptacle of an electronics housing (not shown in FIG. 3), which includes a force analysis control unit 204. In this manner, the strain gage 202 may be in communication with the force analysis control unit 204 (shown in FIG. 1). In at least one other embodiment, the strain gage 202 may be wirelessly coupled to the force analysis control unit 204.

FIG. 4 illustrates a cross-sectional view of an end of a side frame through line 3-3 of FIG. 2, according to an embodiment of the present disclosure. In this embodiment, an electronics housing 230 is secured within the inboard lightener hole 200a. For example, the electronics housing 230 is snapably secured within the inboard lightener hole 200a. The electronics housing 230 contains a force analysis control unit 204, and may also include a battery 232, and a communication device (such as a transmitter, receiver, transceiver, and/or the like) that allows for communication with other force analysis control units 204, a database, a user interface, and/or the like. The plug 216 coupled to the strain gage 202 (hidden from view in FIG. 4) couples the strain gage 202 to the electronics housing 230, thereby allowing the strain gage 202 to communicate with the force analysis control unit 204, receive power from the battery, and/or the like. Optionally, the electronics housing 230 may not be secured within the inboard lightener hole 200a. Instead, the electronics housing 230 may be disposed within a different lightener hole 200b or 200c, or within various other areas of the first side frame 106.

FIG. 5 illustrates a perspective cross-sectional view of a side frame through line 5-5 of FIG. 2, according to an embodiment of the present disclosure. As shown in FIG. 5, two strain gages 202 may be secured to the interior rim 212 that defines the inboard lightener hole 200a. The two strain gages 202 may be symmetrically disposed in relation to a longitudinal plane 240 of the first side frame 106. For example, one strain gage 202 is secured to the interior rim 212 to one side of the longitudinal plane 240, while the other strain gage 202 is secured to the interior rim 212 to an opposite side of the longitudinal plane 240. Optionally, a single strain gage 202 may be disposed within the inboard lightener hole 200a. As another alternative, more than two strain gages 202 may be disposed within the inboard lightener hole 200a.

The inboard lightener hole 200a is shown sectioned at the neutral axis Y-Y and Z-Z axes. A load path is from the pedestal 142 through the first side frame 106. Vertical load 250 is a radial path about the neutral Y-Y axis Y-Y. Lateral load 252 is a radial path about neutral axis Z-Z. Longitudinal loads 254 react over the entire section. The loads 250, 252, and 254 concentrate around the inboard lightener hole 200a on the vertical wall at location 256. As such, by positioning the strain gage(s) 202 at or proximate the location 256, the strain gage(s) 202 are able to effectively detect forces and force components.

Referring to FIGS. 1 and 5, two symmetrical strain gages 202 may be disposed in each of the inboard lightener holes 200a. As such, the truck assembly may include a total of eight strain gages 202. Positioning two strain gages 202 in each inboard lightener hole 200a allows for effective detection of forces, such as stresses and strains, exerted to both sides of the longitudinal plane 240 (for example, reciprocal and complementary force detection). Further, positioning two strain gages 202 within the lightener holes 200a at each of the four positions (that is, each of the first and second ends of the first and second side frames 106 and 108) allows for effective detection of forces at the four locations of the truck assembly 100 at which forces may be concentrated during operation of the rail vehicle 101.

Figure 6:
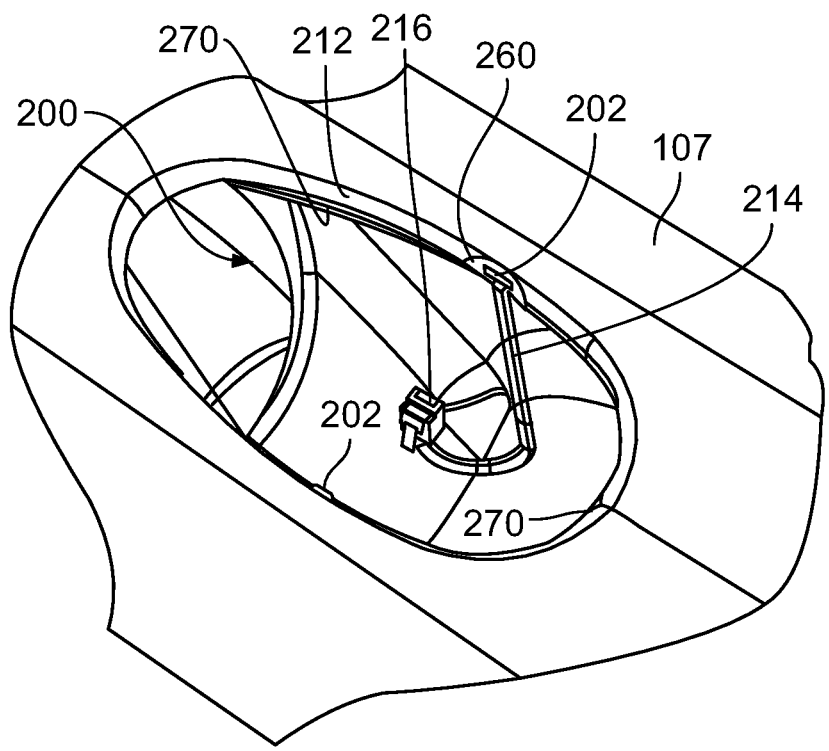
FIG. 6 illustrates a perspective top view of a strain gage disposed within a lightener hole, according to an embodiment of the present disclosure.

FIG. 6 illustrates a perspective top view of a strain gage 202 disposed within a lightener hole 200, according to an embodiment of the present disclosure. In at least one embodiment, two strain gages 202 are secured to the interior rim 212 of the lightener hole 200.

A recessed pocket 260 may be formed within the interior rim 212. For example, the recessed pocket 260 may be indented into the interior rim 212. The recessed pocket 260 may radially extend outwardly away from a center of the lightener hole 200, towards the structure of the top surface 107.

The recessed pocket 260 may be sized and shaped to receive the strain gage 202 so that the strain gage 202 does not extend inwardly past an inner perimeter 270 of the interior rim 212. As such, if an electronics housing is inserted into the lightener hole 200, an outer portion of the housing may not abut into the strain gage 202 due to the recessed nature of the strain gage 202. Optionally, the lightener hole 200 may not include the recessed pocket 260.

The strain gage(s) 202 may be located at areas, such as within the recessed pocket(s) 260 as shown in FIG. 6, where structural stresses and strains are concentrated, as described above with respect to FIG. 5. The strain gage(s) 202 may be welded or bonded to the recessed pocket(s) 260.

Figure 7:
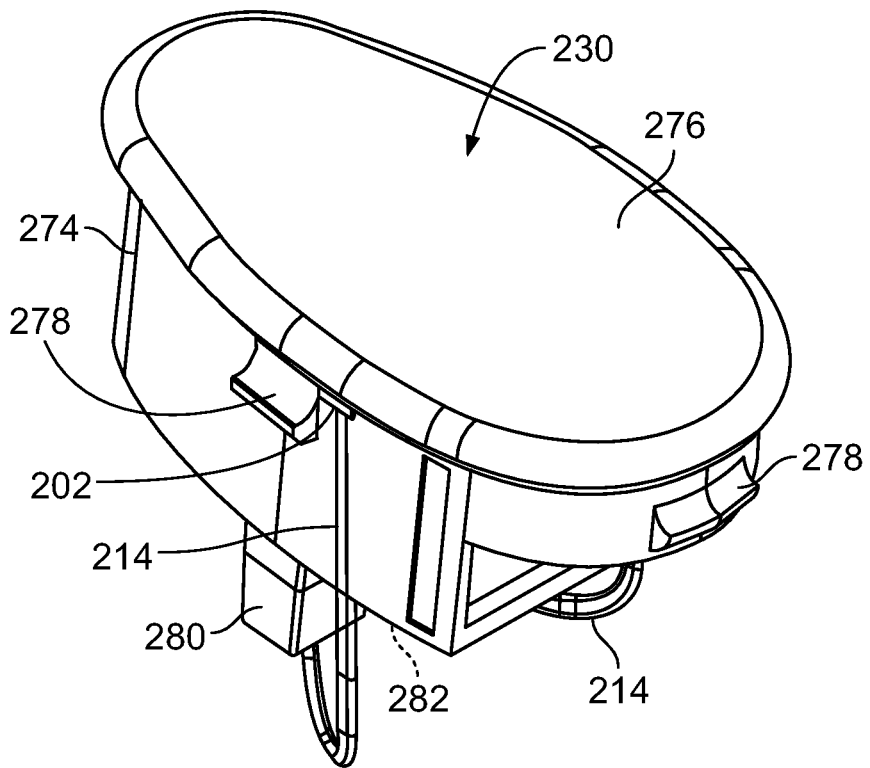
FIG. 7 illustrates a perspective top view of an electronics housing, according to an embodiment of the present disclosure.

FIG. 7 illustrates a perspective top view of the electronics housing 230, according to an embodiment of the present disclosure. The electronics housing 230 is sized and shaped to fit within the lightener hole 200 (shown in FIG. 6). The electronics housing 230 includes a perimeter wall 274 that fits into the lightener hole 200. A top cap 276 is secured to the perimeter wall 274, and is configured to fit over portions of the top surface 107 (shown in FIG. 6) and the lightener hole 200. One or more clips 278 outwardly extend from the perimeter wall 274, and are configured to snapably secure the electronics housing 230 into the lightener hole 200.

Receptacles 280 are coupled to the electronics housing 230. For example, the receptacles 280 may downwardly extend from a lower base 282 of the electronics housing 230. The receptacles 280 receive and retain the plugs 216 (shown in FIG. 3) that connect to the strain gages 202.

Referring to FIGS. 6 and 7, when the electronics housing 230 is secured within the lightener hole 200, the electronics housing 230 covers and protects the strain gage(s) 202. Alternatively, the electronics housing 230 may not be used.

Referring to FIGS. 1-7, certain embodiments of the present disclosure provide a truck assembly 100 of a rail vehicle 101 that includes a side frame 106 or 108. One or more strain gages 202 are disposed within one or more lightener holes 200 of the side frame 106 or 108.

In at least one embodiment, the strain gage(s) 202 are configured to detect structural shear and bending strain displacement of the side frame 106 or 108 generated by forces created by vehicle dynamics, impacts, braking, and loading or unloading of the vehicle. Strain information from the truck assemblies 100 may be used to separate and identify an individual event.

Figure 8:
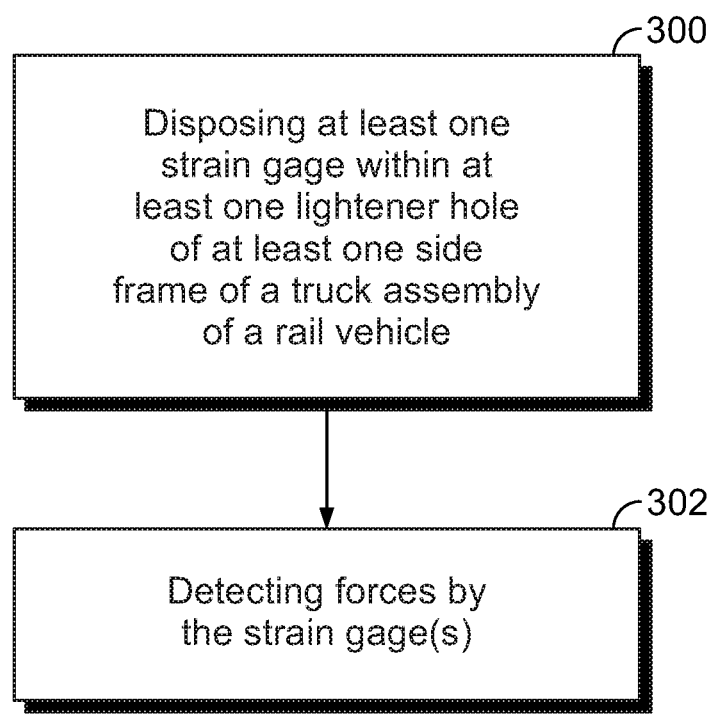
FIG. 8 illustrates a flow chart of a method of detecting forces exerted into or onto a truck assembly of a rail vehicle, according to an embodiment of the present disclosure.

FIG. 8 illustrates a flow chart of a method of detecting forces exerted into or onto a truck assembly of a rail vehicle, according to an embodiment of the present disclosure. The method includes disposing (300) at least one strain gage within at least one lightener hole of at least one side frame of a truck assembly of the rail vehicle, and detecting (302) the forces by the strain gage(s).

As described herein, embodiments of the present disclosure provide sensor systems and methods for a truck assembly of a rail vehicle that effectively determine various forces exerted into and/or onto the truck assembly and/or the rail vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §

112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A truck assembly for a rail vehicle, the truck assembly comprising:
    at least one side frame including at least one lightener hole defined by at least one rim including at least one recessed pocket; and
    at least one strain gage disposed within the at least one lightener hole, wherein the at least one strain gage is secured to the at least one recessed pocket, and wherein the at least one strain gage is configured to detect forces exerted into or onto the truck assembly.

2. The truck assembly of claim 1, wherein the at least one side frame comprises a first side frame and a second side frame.

3. The truck assembly of claim 2, wherein the at least one lightener hole comprises:
    a first lightener hole of the first side frame; and
    a second lightener hole of the second side frame.

4. The truck assembly of claim 3, wherein the at least one strain gage comprises:
    a first strain gage disposed in the first lightener hole; and
    a second strain gage disposed in the second lightener hole.

5. The truck assembly of claim 4, wherein the at least one strain gage comprises:
    a first strain gage disposed in the first lightener hole; and
    a second strain gage disposed in the first lightener hole.

6. The truck assembly of claim 5, wherein the first strain gage and the second strain gage are symmetrically disposed in relation to a longitudinal plane of the first side frame.

7. The truck assembly of claim 2, wherein the at least one lightener hole comprises:
    a first inboard lightener hole formed in a first end of the first side frame;
    a second inboard lightener hole formed in a second end of the first side frame;
    a third inboard lightener hole formed in a first end of the second side frame; and
    a fourth inboard lightener hole formed in a second send of the second side frame.

8. The truck assembly of claim 7, wherein the at least one strain gage comprises:
    a first strain gage disposed within the first inboard lightener hole;
    a second strain gage disposed within the first inboard lightener hole;
    a third strain gage disposed within the second inboard lightener hole;
    a fourth strain gage disposed within the second inboard lightener hole;
    a fifth strain gage disposed within the third inboard lightener hole;
    a sixth strain gage disposed within the third inboard lightener hole;
    a seventh strain gage disposed within the fourth inboard lightener hole; and
    an eighth strain gage disposed within the fourth inboard lightener hole.

9. The truck assembly of claim 1, further comprising at least one force analysis control unit in communication with the at least one strain gage, wherein the at least one force analysis control unit is configured to analyze at least one force signal received from the at least one strain gage.

10. The truck assembly of claim 9, wherein the at least one force analysis control unit is disposed on or within the truck assembly.

11. The truck assembly of claim 9, further comprising at least one electronics housing secured within the at least one lightener hole, wherein the at least one force analysis control unit is contained within the at least one electronics housing.

12. The truck assembly of claim 11, wherein the electronics housing covers and protects the at least one strain gage.

13. A method of detecting forces exerted into or onto a truck assembly of a rail vehicle, the method comprising:
    disposing at least one strain gage within at least one lightener hole of at least one side frame of a truck assembly of the rail vehicle, wherein said disposing comprises securing the at least one strain gage to least one recessed pocket of the at least one lightener hole; and
    detecting the forces by the at least one strain gage.

14. The method of claim 13, wherein said disposing comprises:
    disposing a first strain gage within a first inboard lightener hole of a first side frame;
    disposing a second strain gage within the first inboard lightener hole of the first side frame;
    disposing a third strain gage a second inboard lightener hole of the first side frame;
    disposing a fourth strain gage within the second inboard lightener hole of the first side frame;
    disposing a fifth strain gage within a third inboard lightener hole of a second side frame;
    disposing a sixth strain gage within the third inboard lightener hole of the second side frame;
    disposing a seventh strain gage within a fourth inboard lightener hole of the second side frame; and
    disposing an eighth strain gage within the fourth inboard lightener hole of the second side frame.

15. The method of claim 13, further comprising:
    communicatively coupling at least one force analysis control unit with the at least one strain gage; and
    analyzing, by the at least one force analysis control unit, at least one force signal received from the at least one strain gage.

16. The method of claim 15, further comprising disposing the at least one force analysis control unit within the at least one lightener hole.

17. The method of claim 16, further comprising covering and protecting the at least one strain gage with at least one electronics housing that contains the at least one force analysis control unit.

18. A truck assembly for a rail vehicle, the truck assembly comprising:
    a first side frame having a first inboard lightener and a second inboard lightener hole;

a second side frame having a third inboard lightener hole and a fourth inboard lightener hole;

a first strain gage disposed within the first inboard lightener hole;

a second strain gage disposed within the first inboard lightener hole, wherein the first strain gage and the second strain gage are symmetrically disposed in relation to a first longitudinal plane of the first side frame;

a third strain gage disposed within the second inboard lightener hole;

a fourth strain gage disposed within the second inboard lightener hole, wherein the first strain gage and the second strain gage are symmetrically disposed in relation to the first longitudinal plane of the first side frame;

a fifth strain gage disposed within the third inboard lightener hole;

a sixth strain gage disposed within the third inboard lightener hole, wherein the fifth strain gage and the sixth strain gage are symmetrically disposed in relation to a second longitudinal plane of the second side frame;

a seventh strain gage disposed within the fourth inboard lightener hole;

an eighth strain gage disposed within the fourth inboard lightener hole, wherein the seventh strain gage and the eighth strain gage are symmetrically disposed in relation to the second longitudinal plane of the second side frame, wherein the strain gages are configured to detect forces exerted into or onto the truck assembly; and at least one force analysis control unit in communication with the strain gages, wherein the at least one force analysis control unit is disposed on or within the truck assembly, and wherein the at least one force analysis control unit is configured to analyze force signals received from the strain gages.

19. A truck assembly for a rail vehicle, the truck assembly comprising:

at least one side frame including at least one lightener hole;

at least one strain gage disposed within the at least one lightener hole, wherein the at least one strain gage is configured to detect forces exerted into or onto the truck assembly; and at least one force analysis control unit in communication with the at least one strain gage, wherein the at least one force analysis control unit is configured to analyze at least one force signal received from the at least one strain gage, and wherein the at least one force analysis control unit is disposed on or within the truck assembly.

20. The truck assembly of claim 19, further comprising at least one electronics housing secured within the at least one lightener hole, wherein the at least one force analysis control unit is contained within the at least one electronics housing.

21. The truck assembly of claim 20, wherein the electronics housing covers and protects the at least one strain gage.

22. A method of detecting forces exerted into or onto a truck assembly of a rail vehicle, the method comprising:

disposing at least one strain gage within at least one lightener hole of at least one side frame of a truck assembly of the rail vehicle;

detecting the forces by the at least one strain gage;

disposing at least one force analysis control unit within the at least one lightener hole;

communicatively coupling the at least one force analysis control unit with the at least one strain gage; and analyzing, by the at least one force analysis control unit, at least one force signal received from the at least one strain gage.

23. The method of claim 22, further comprising covering and protecting the at least one strain gage with at least one electronics housing that contains the at least one force analysis control unit.

* * * * *